UNITED STATES PATENT OFFICE.

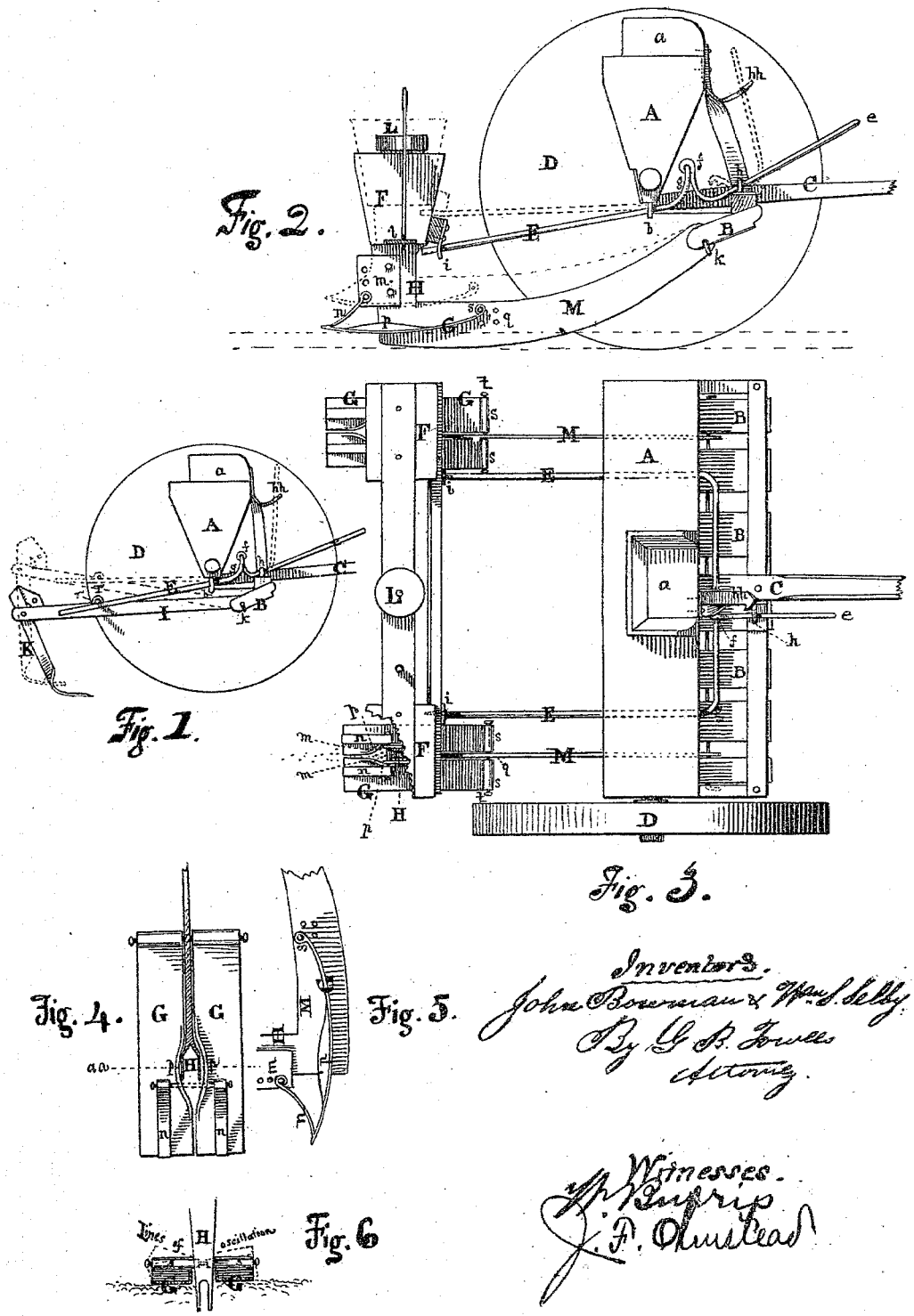

JOHN BOWMAN AND WILLIAM G. SELBY, OF PRINCEVILLE, ILLINOIS.

IMPROVEMENT IN COMBINED SEEDERS, PLANTERS, AND CULTIVATORS.

Specification forming part of Letters Patent No. 115,688, dated June 6, 1871.

*To all to whom it may concern:*

Be it known that we, JOHN BOWMAN and WILLIAM G. SELBY, both of the town of Princeville, in the county of Peoria and in the State of Illinois, have invented a new and Improved Seeder, Cultivator, and Planter combined; and do hereby declare that the following is a full, clear, and exact description thereof, reference being had to the annexed drawing making a part of this specification, in which like letters of reference refer to like parts, and in which—

Figure 1 represents a side elevation, showing the machine arranged as a seeder and cultivator; Fig. 2, a side elevation of planter; Fig. 3, a plan view of the latter. Fig. 4 is a top view of shoes or fillers; Fig. 5, a side view of the latter; and Fig. 6, a cross-section.

Like letters in the different figures of the drawing indicate like parts.

Our invention relates to an arrangement of parts by which the machine may be readily convertible either into a seeder and planter, or a seeder and cultivator combined, as will be hereinafter fully explained.

Fig. 1 shows the machine when arranged and used as a seeder and cultivator, the cultivators I K being attached to the front of the seeder, at B, by means of the rod k, and are raised from the soil by means of the sliding lever e, confined in the staple h on the front beam of the seeder, and having an eye at f which depresses the horizontal bar forming the front part of the elevating-rods E E when the handle of the lever e is raised. The depression of the point f of the rods E E raises the series of cultivators attached to the seeder, which are all united to a horizontal rod, v, lying on the rods E E, by means of a staple, i, on each beam. When this machine is arranged so as to be convertible into a cultivator the series of cultivators I is removed by removing the rod k and attaching the runners G M M of the planter F G H at the same part, and by inserting the same rod k, the planter being dragged behind the machine instead of going before, as in other machines. The machine arranged as a corn-planter is shown in Figs. 2 and 3.

A is the seed-box, supported, as in other cases, on wheels, the driver's seat being shown at a. A catch or hook, h h, is attached to its front for retaining the handle of the lever e, afterward described. B are seed-boxes. A rod, k, passes through each box to drag the runners M of the planter, or, at other times, the cultivators I, Fig. 1. C, the tongue; D, the wheels; E E, two parallel movable rods united in front of the box A, the two arms of which pass beneath through staples or slots b, under either end of the wheel-axle, into slots or staples i i on the respective dropper-boxes F F of the planter. These boxes are raised or lowered by means of a lever, e, in front of box A, which slides in a staple, h, on the front bar, and, curving upward, terminating in an eye, f, which embraces the horizontal front rod of said bearing-rods E E. These rods may be hung or jointed to the under surface of the wheel-axle, or placed in any other way to secure the same objects. F F are the dropper-boxes of planter, with the common dropping mechanism and runners of the usual kind, H M. G G are shoes or fillers, placed on either side of each shank and runner. These shoes or fillers are curved plates hung horizontally on each side of the shank H. Their forward ends s s embrace a common bolt or vibrating pin, t, which passes through either of the holes q in and near the upper edge of runners. From this point the fillers or shoes curve gently downward, running closely beside the runner and shank, but are bent upward, where they pass the shank, into a vertical flange, p; thence they pass to rear of shank, coming more nearly together, and running parallel with each other to a short distance behind the shank. At this point a strip of their substance, n, is bent upward (or otherwise a similar piece may be attached here) and backward at an angle toward the runner and attached to a pin, common to both, which passes through either of the adjusting-holes in a plate, m, on the shank H, or in either of the holes q in the runner itself.

The operation of this machine is as follows: In the machine, when used as a seeder and cultivator, Fig. 1, the lever e raises the cultivators from the ground by operating on the lifting-rod E carrying a rod, v, which passes through staples in each of the cultivator-beams I. When the machine is used as a planter the rod k, which retained the cultivator-beams, now retains the forward ends of each of the runners M M of the planter, which, in this plan, follows the seeder A. The runners, shank, dropper, and boxes are not novel, but the shoes or fillers G and the bearing-rods E E, as applied, are new. The former fillers being attached at *s* so as to oscillate accommodate themselves to the lay of the soil and fill up the grooves left after planting, being further assisted by the pressure of the springs *n n* forcing each filler downward to secure a constant downward pressure, even when the runner may be unduly elevated. Either of the holes in the shank or in those, *q*, in the runner, can be used to suit the requirements or condition of the soil at time of planting. The planter F G H can be raised at least a foot from the ground by the operation of the lever *e* acting on the bearing-rods E E, the handle of lever *e* being then secured in the notch of the catch *h h* on the box A at the driver's hand. The person who operates the dropper sits on the seat L in the rear of and entirely out of the way of the driver, and can thus mount or descend the seat with extra facility.

The planter portion of the machine can be raised entirely from the ground by the bars E E, so that there is no necessity for transporting the machine in a wagon from house to field.

Having thus fully described our invention, what we claim therein as new, and desire to secure by Letters Patent, is—

The arrangement of the interchangeable rods K and *v*, seeders B, bearing or support rods E E, lifting-lever *e*, and catch *h h*, whereby either the cultivators I or the planters F may be readily combined with the seeder, the whole constructed so as to operate substantially in the manner as herein described.

In testimony that we claim the foregoing we have hereunto set our hands this 7th day of December, 1870.

JOHN BOWMAN.
WILLIAM G. SELBY.

Witnesses:
HENRY W. WELLS,
EDMUND THURLOW.